United States Patent
Liu et al.

(10) Patent No.: US 8,738,442 B1
(45) Date of Patent: May 27, 2014

(54) SYSTEM AND MECHANISM FOR GUARANTEEING DELIVERY ORDER OF VIRTUAL CONTENT

(75) Inventors: Zhenyu Liu, San Jose, CA (US); Ping Wu, Saratoga, CA (US)

(73) Assignee: Google Inc., Mountain View, CA (US)

( * ) Notice: Subject to any disclaimer, the term of this patent is extended or adjusted under 35 U.S.C. 154(b) by 252 days.

(21) Appl. No.: 13/149,581

(22) Filed: May 31, 2011

(51) Int. Cl.
G06Q 30/00 (2012.01)
G06Q 30/02 (2012.01)

(52) U.S. Cl.
CPC ........ G06Q 30/0264 (2013.01); G06Q 30/0251 (2013.01); G06Q 30/0244 (2013.01); G06Q 30/0241 (2013.01)
USPC ................. 705/14.61; 705/14.49; 705/14.43; 705/14.4

(58) Field of Classification Search
CPC .................................................. G06Q 30/0264
USPC ....................................................... 705/14.61
See application file for complete search history.

(56) References Cited

U.S. PATENT DOCUMENTS

| | | |
|---|---|---|
| 2002/0188679 A1 | 12/2002 | Matous et al. |
| 2003/0041050 A1* | 2/2003 | Smith et al. ........................ 707/1 |
| 2009/0287515 A1 | 11/2009 | Mehta et al. |
| 2010/0211457 A1 | 8/2010 | Martin-Cocher et al. |
| 2010/0217662 A1 | 8/2010 | Ramer et al. |
| 2010/0250348 A1* | 9/2010 | Dunbar ........................ 705/14.4 |
| 2010/0324992 A1 | 12/2010 | Birch |

OTHER PUBLICATIONS

Mann, "Companies to bid on ad space directly", TechSpot, Jun. 19, 2006, on line at techspot.com/news/21943-companies-to-bid-on-ad-space-directly.html.*

* cited by examiner

*Primary Examiner* — John G Weiss
*Assistant Examiner* — Scott C Anderson
(74) *Attorney, Agent, or Firm* — Birch, Stewart, Kolasch & Birch, LLP

(57) ABSTRACT

A virtual content server and method are provided for virtual content providers to provide multiple items of their virtual to users as part of an ordered virtual content campaign. A provider may define the order for the presentation of the content items, such as a linear sequence or based on a particular logic, e.g., a state transition graph or matrix, and such order information is stored in a campaign database. The server stores information regarding the state of the campaign for a particular user, e.g., how many or which ones of the content items of the ordered campaign have been presented to the user. Additionally, the provider may define certain performable actions with respect to particular states or content items. Actions performed by the user may be detected, and the server may store information regarding performed actions in association with the user id. In this manner, the next virtual content item in the ordered campaign to serve to the user in response to a virtual content request may be decided based on the current state of the campaign and/or the actions performed with respect to the campaign.

25 Claims, 10 Drawing Sheets

Linear display order        300a

300b

Example state transition graph for more
complicated presentation order

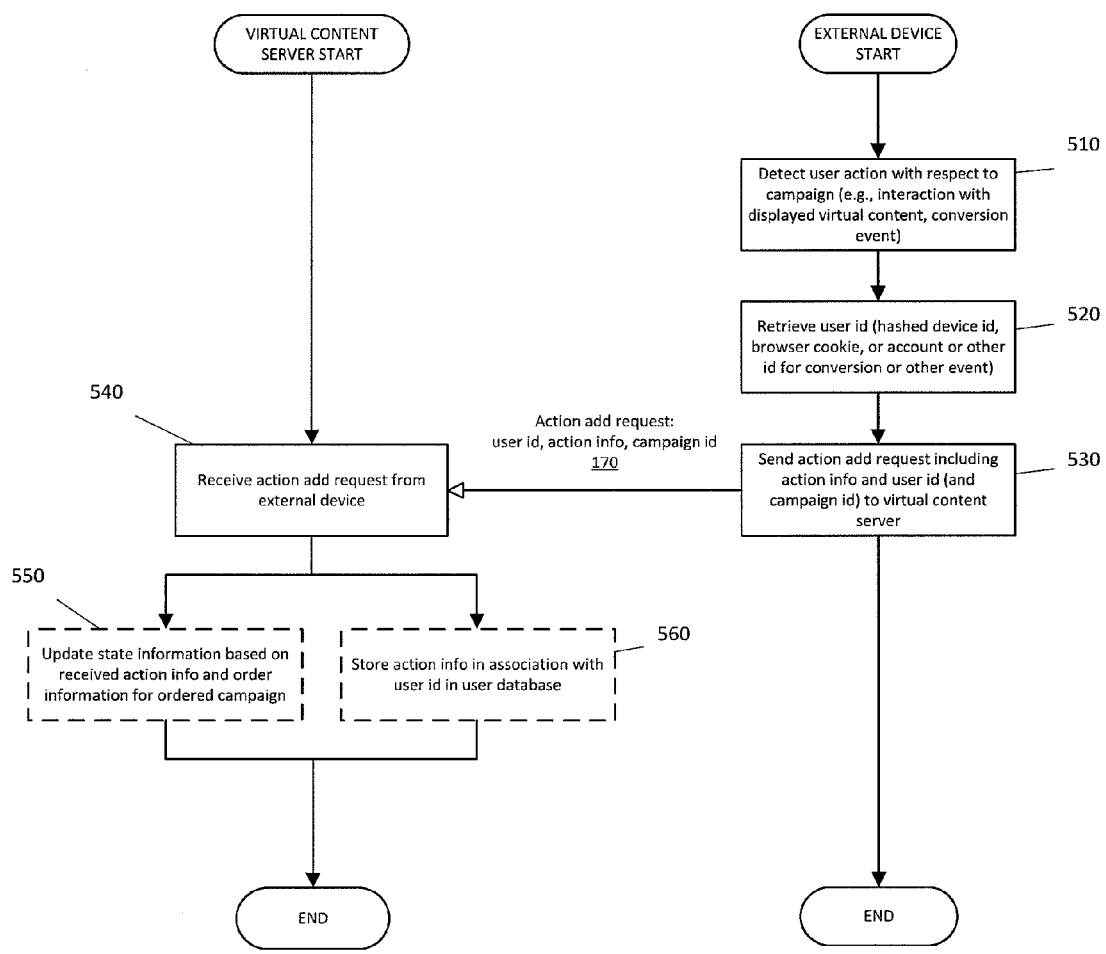

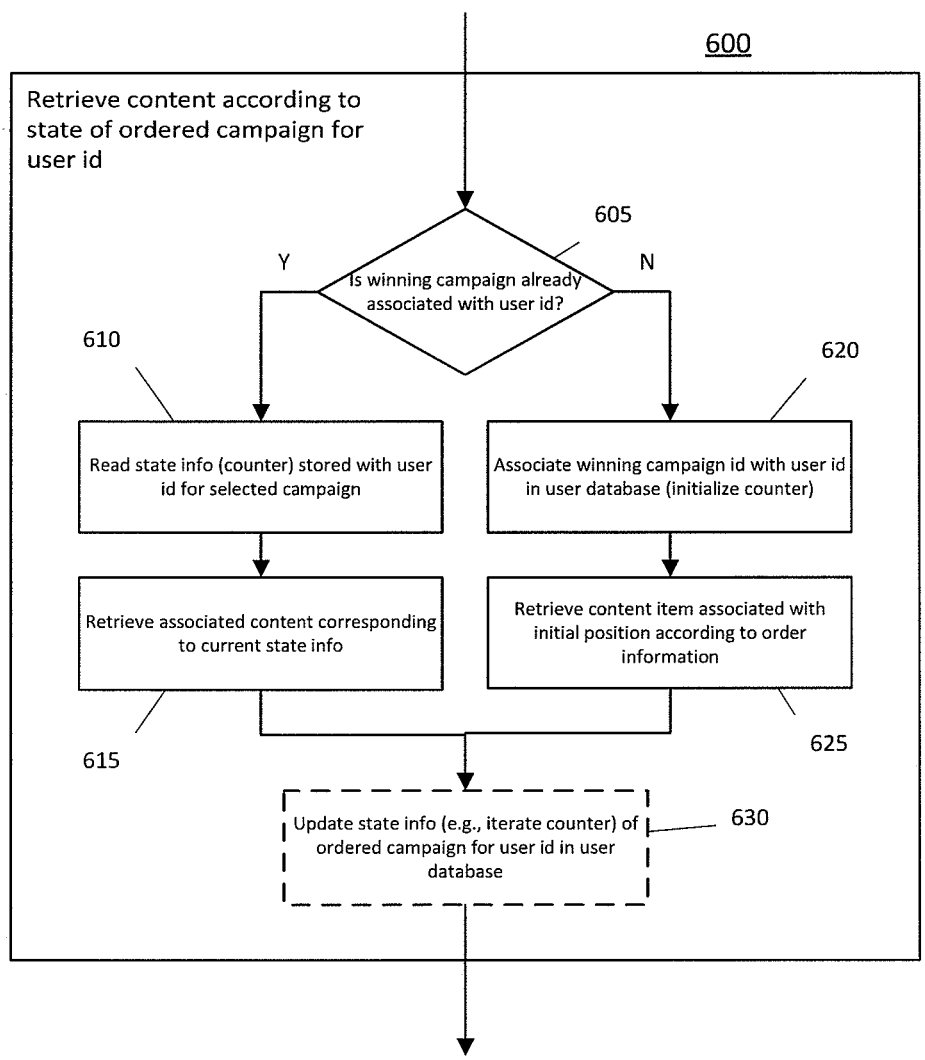
FIG. 6 Linear order example

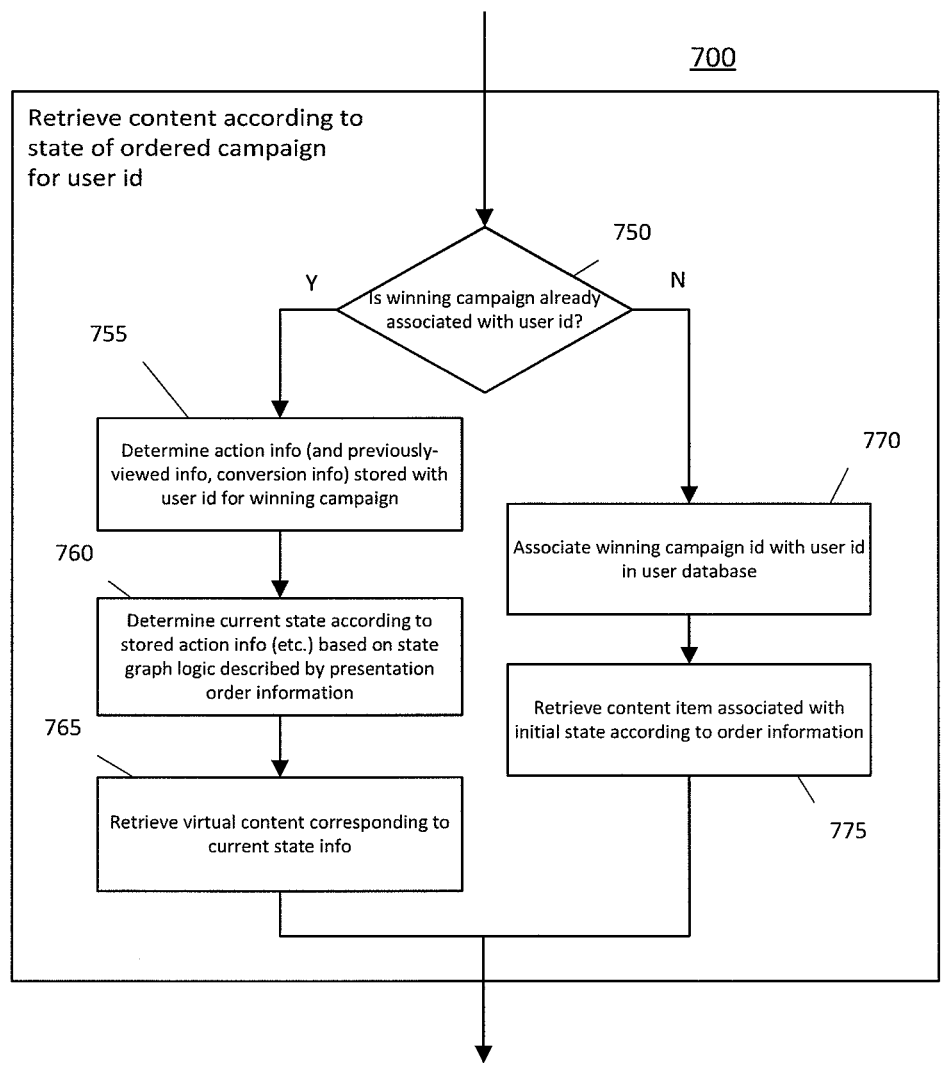
FIG. 7  State transition graph example

FIG. 8 – Campaign Database

800

| Virtual content provider account id /810 | Campaign id /820 | Associated content info /830 | Presentation order information /840 |
|---|---|---|---|
| provider_A | campaign_1 | content group_1 | order_1 (e.g. linear sequence) |
| provider_B | campaign_2 | content group_2 | order_2 |
|  | campaign_3 | content group_3 | order_3 |
| provider_C | campaign_N (non-ordered) | content group_N | [none] |
|  | campaign_4 | content group_4 | order_4 (e.g. state transition graph) |
|  | campaign_5 | content group_5 | order_5 |
|  | ... |  |  |

FIG. 9 – User Database (Linear)

900

| User id | Non-ordered campaign ids / other user information (optional) | Ordered campaign ids | Current state (e.g., counter) |
|---|---|---|---|
| user_1 | | campaign_x | state_x |
| | | campaign_y | state_y |
| user_2 | campaign_n | campaign_x | state_x |
| | | campaign_z | state_z |
| user_3 | | campaign_z | state_z |

910 / 920 / 930 / 940

FIG. 10 – User Database (Complex)

1000

| User id | Campaign id | Action info (e.g., clicks, mouse-overs, "calls," etc.) | Previously-served content info (optional) | Recent state (optional) |
|---|---|---|---|---|
| user_1 | campaign_x | action_x3-3 | served_content_x | state_x |
| user_2 | campaign_x | action_x1-1 | served_content_x | state_x |
|  | campaign_y | action_y2-1 | served_content_y | state_y |
|  | campaign_z | [null] | served_content_z | state_z |
| user_3 | campaign_y | action_y1-1 | served_content_y | state_y |
|  |  | action y2-1 |  |  |
|  |  | action_yC (i.e., conversion) |  |  |

SYSTEM AND MECHANISM FOR GUARANTEEING DELIVERY ORDER OF VIRTUAL CONTENT

TECHNICAL FIELD

The technical field relates to apparatuses and methods for providing virtual content to mobile devices and other computing devices based on information associated with the device itself, applications, and browsers stored on the device, and/or users of the device.

BACKGROUND

The popularity of mobile devices such as cellular phones and portable computing devices continues to increase as more users rely on mobile devices to gain access to virtual content delivered to the users via a network such as a cellular network or the Internet. As such, virtual content providers are competing with each other to attract more users to their virtual content. For example, "on-line" advertisers are constantly looking for ways to expand the reach of their advertisements to as many devices as possible and thereby increase sales via increased responses to their advertisement content by users.

BRIEF SUMMARY OF THE INVENTION

A concept of the invention is to provide technical solutions granting virtual content providers (e.g., advertisers) an opportunity to provide multiple items of their virtual content, such as multiple advertisements or ad groups, to users in a particular sequence, according to a particular logic, according to particular actions performed by the user with respect to the virtual content, etc., as part of an ordered virtual content campaign. For example, a virtual content provider may wish to present a sequence of ads (ad creatives) to a specified group of users such that the users are presented with (i.e., served, delivered) the ads in a predetermined order.

More generally, implementations of the inventive concepts may include a computer-implemented method, comprising: receiving an ordered campaign creation request; storing an ordered campaign in association with campaign-associated content including a plurality of content items, and state-transition information relating to a presentation of the content items; storing campaign state information indicating a current state of the ordered campaign in association with a user id of a user; receiving a virtual content request from an external device, the virtual content request including the user id; selecting, according to the campaign state information, a content item of the campaign-associated content to send to the external device in response to the virtual content request; sending the selected content item to the external device; and updating the campaign state information of the ordered campaign.

According to other aspects, the method of the invention may further comprise: storing a campaign id of the ordered campaign in association with the user id of the user presented with an item of the campaign-associated content; determining the campaign id stored in association with the user id received in the virtual content request; retrieving, as at least part of a plurality of virtual content candidates, a content item of the campaign-associated content of the ordered campaign according to the determined campaign id; selecting a virtual content candidate from among the plurality of virtual content candidates, updating the campaign state information of the ordered campaign when the selected virtual content candidate is a content item of the campaign-associated content of the ordered campaign.

In some embodiments, the state transition information indicates a sequence of the content items to be presented, the campaign state information indicates a current position in the sequence, and updating the campaign state information comprises incrementing the indicated position in the sequence. In other embodiments the state transition information describes a state transition graph including states each corresponding respectively to an item of the content items of campaign-associated content, the campaign state information indicates the current state of the campaign for the received user id according to the state transition graph, and updating the campaign state information comprises moving from the current state to another state according to the state transition graph.

According to other aspects, the method of the invention may further comprise receiving an add action request including the user id and action information identifying an action performed with respect to the ordered campaign.

According to other aspects, the method of the invention may further comprise: storing the action information included in the add action request in association with the received user id, in response to receiving the add action request, wherein the campaign state information is updated according to the state transition graph based on the action information stored in association with the user id.

In some embodiments, the campaign state information is updated at the time the add action request is received. In other embodiments, the campaign state information is updated at the time the virtual content request is received, based on the action information stored in association with the user id received in the virtual content request. In still other embodiments, the campaign state information is maintained at the current state unless action information identifying an action performed with respect to the current state of the ordered campaign has been previously stored in association with the user id.

According to other aspects, campaign state information is updated by moving to another state when a content item of the current state has been selected as the selected virtual content candidate a predetermined number of times, even if action information identifying an action performed with respect to the current state of the ordered campaign has not been previously stored in association with the user id. In other embodiments, the campaign state information is updated by moving to another state after a predetermined time period has elapsed, even if action information identifying an action performed with respect to the current state of the ordered campaign has not been previously stored in association with the user id. In some embodiments of the invention, the add action request further includes the campaign id.

According to other aspects, the action information may indicate one or more of: selecting a hyperlink displayed in a content item, selecting a displayed click-to-call icon to initiate a phone call, saving a displayed call number in a contact list on a device of the user, indicating a preference for a particular content item of the ordered campaign using a social network, sharing a particular content item of the ordered campaign using a social network, expanding a displayed content item of the ordered campaign, initiating video playback associated with a content item, a mouse-over event with respect to a displayed content item, and a conversion event associated with the content item.

According to other aspects, the state transition information describes a state transition matrix including states each corresponding respectively to an item of the content items of campaign-associated content, the state transition matrix defines presentation preconditions for each state, and updating the campaign state information comprises moving from the current state to a state whose presentation preconditions have been satisfied.

According to other aspects, the method of the invention may further comprise: determining a plurality of campaign ids stored in a user database in association with the received user id; retrieving, as part of the plurality of virtual content candidates, content items of each of the plurality of determined campaign ids corresponding to the campaign state information associated with each campaign id, respectively.

According to other aspects, the campaign-associated content is virtual content uploaded to the virtual content server and associated with the ordered campaign based on input from a front end interface.

According to other aspects, the user id is one of a device id uniquely identifying the external device and an identifier uniquely identifying the user. In some embodiments, the method of the invention may further comprise anonymizing the user id.

According to other aspects, the ordered campaign creation request includes one or more of a virtual content provider id; label data for describing the ordered campaign; association data indicating virtual content stored in a virtual content database to be associated with the campaign as campaign-associated content; and the state transition information for the campaign-associated content.

According to other aspects, the selected virtual content candidate is selected from among the plurality of virtual content candidates based on one or more factors including which of the virtual content candidates have been previously presented more often and auction bids associated with the virtual content candidates. In some embodiments, virtual content candidates of the ordered campaign participate in an auction with virtual content candidates of non-ordered campaigns. In other embodiments, the method of the invention further comprises assessing fees to charge the virtual content provider as a function of an auction bid indicating how much the virtual content provider is willing to pay per action performed with respect to the selected virtual content candidate.

Additional implementations of the inventive concepts may include a virtual content serving system, comprising: a processor; and a memory, operatively coupled to the processor, including executable instructions for performing operations comprising: receiving an ordered campaign creation request; storing an ordered campaign in association with campaign-associated content including a plurality of content items, and state-transition information relating to a presentation of the content items; storing campaign state information indicating a current state of the ordered campaign in a user database in association with a user id of a user; receiving a virtual content request from an external device, the virtual content request including the user id; selecting, according to the campaign state information, a content item of the campaign-associated content to send to the external device in response to the virtual content request; sending the selected content item to the external device; and updating the campaign state information of the ordered campaign. In some embodiments, the virtual content serving system comprises a distributed computing system.

Further implementations of the inventive concepts may include a computer readable medium storing a program which when executed by a processor causes the computer to perform a method, comprising: receiving an ordered campaign creation request; storing an ordered campaign in association with campaign-associated content including a plurality of content items, and state-transition information relating to a presentation of the content items; storing campaign state information indicating a current state of the ordered campaign in association with a user id of a user; and receiving a virtual content request from an external device, the virtual content request including the user id; selecting, according to the campaign state information, a content item of the campaign-associated content to send to the external device in response to the virtual content request; sending the selected content item to the external device; and updating the campaign state information of the ordered campaign.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become readily apparent from this detailed description to those skilled in the art.

BRIEF DESCRIPTION OF THE SEVERAL
VIEWS OF THE DRAWINGS

The present invention will become more fully understood from the detailed description given herein below and the accompanying drawings, which are given by way of illustration only and thus are not limitative of the present invention, and wherein:

FIG. 1 shows a block diagram illustrating an overall system 100 in which an external device 102 transmits a virtual content request 180 to, and receives virtual content 190 from, a virtual content server 120 via a network 144;

FIG. 2 illustrates a flow diagram for a process 200 of generating an ordered campaign in campaign database 124 through operation of a front end interface 142;

Figure 4:
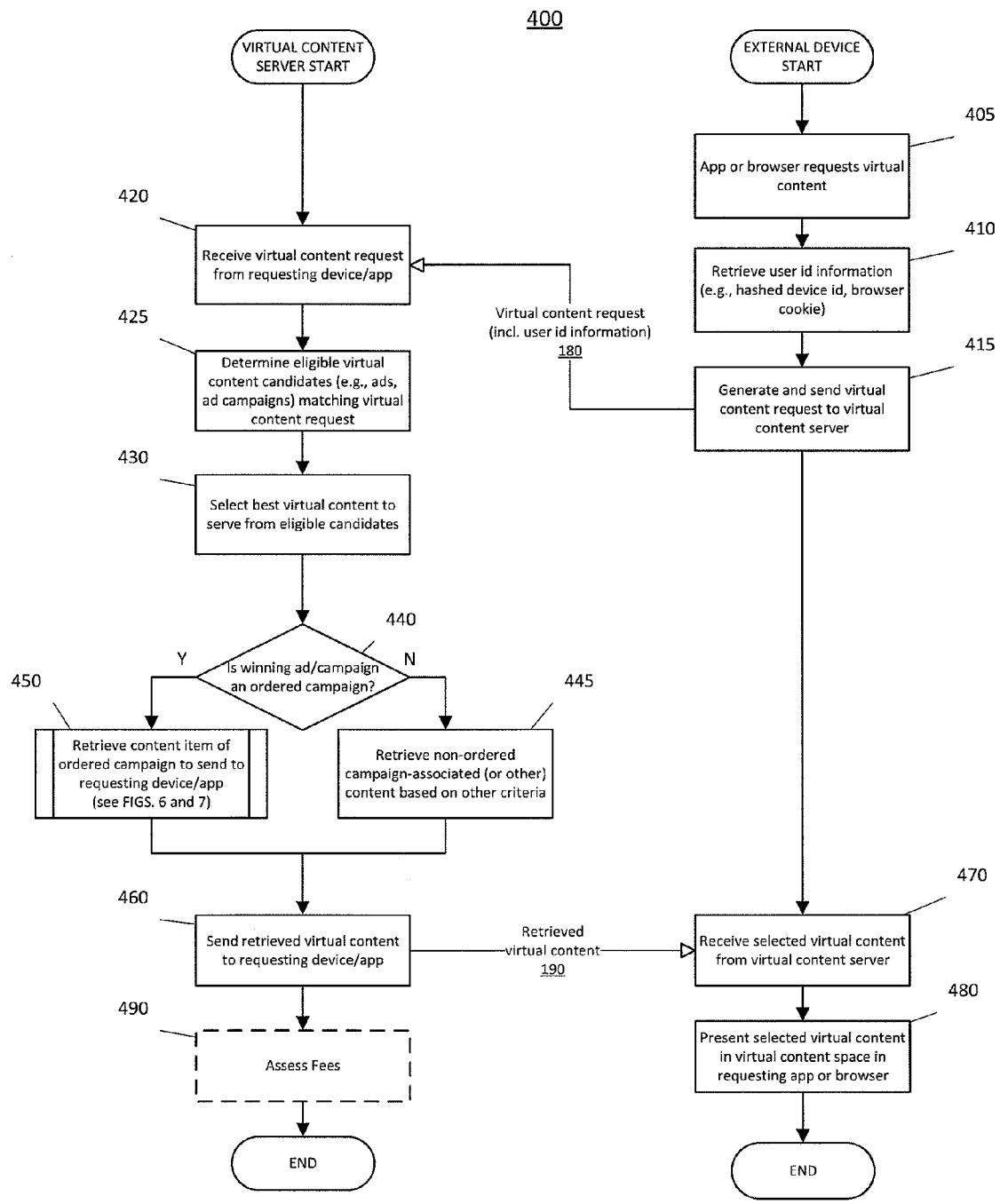

FIG. 4 illustrates a flow diagram of a process 400 of virtual content server 120 retrieving and sending virtual content 190 to external device 102 in response to a virtual content request 180 received from the external device 102;

FIG. 5 illustrates a flow diagram of a process 500 of generating and sending an add action request 170 from device 102 to virtual content server 120;

FIG. 6 illustrates a flow diagram of sub-process 600 (corresponding to step 450 in FIG. 4) for retrieving a virtual content item of a linear ordered campaign from virtual content database 126 based on the current state of the ordered campaign for the user id included in virtual content request 180;

FIG. 7 illustrates a flow diagram of sub-process 700 (corresponding to step 450 in FIG. 4) for retrieving a virtual content item of a state-based ordered campaign from virtual content database 126 according to action information (etc.) stored for the campaign in user database 124 in association with the user id received in the virtual content request 180;

FIG. 8 shows an example in which one or more campaign ids 820 are stored for campaigns in association with a virtual content provider account id 810 in the campaign database 800;

FIG. 9 shows an example in which campaign ids 930 and state information 940 indicating a current state of the ordered campaign for the campaign id are stored in user database 900 in association with user ids 910; and FIG. 10 shows an example in which campaign ids 1020 and action information 1030 are stored in association with user ids 1010 in user database 1000.

The drawings will be described in detail in the course of the detailed description of the invention.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

Figure 1:
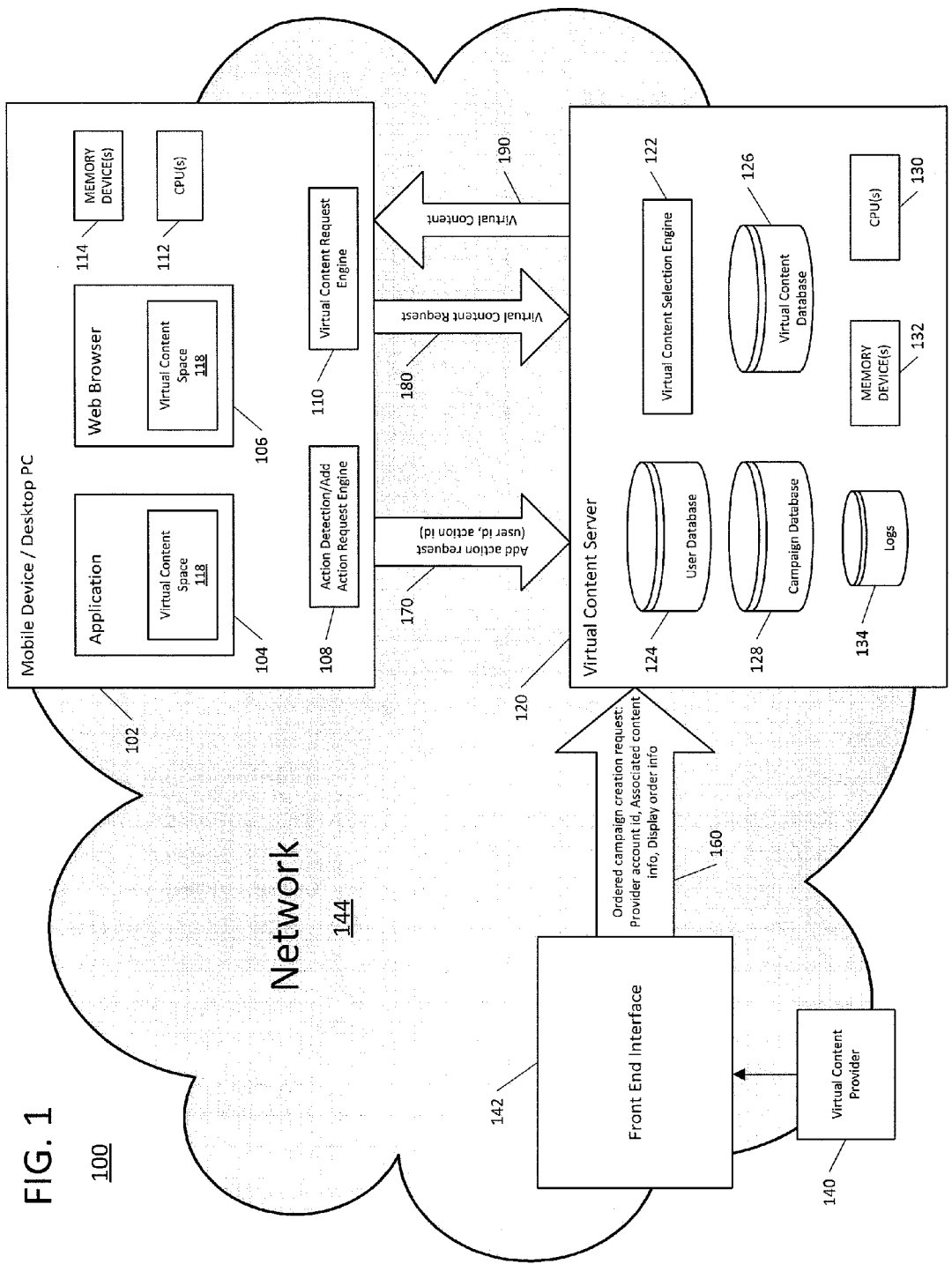

FIG. 1 shows a block diagram illustrating an overall system 100 in which an external device 102 transmits a virtual content request 180 to, and receives virtual content 190 from, a virtual content server 120 via a network 144, according to aspects of the invention.

Network 144 may be the Internet, a cellular network, a wired network, a wireless network, a cloud computing network, or other conventional network technology as generally recognized in the art. It is to be understood that the network 144 provides the framework for transmitting requests and associated information between the elements displayed in FIG. 1, such as between external device 102 and virtual content server 120, between virtual content provider 140 and front end interface 142, and between front end interface 142 and virtual content server 120, in a manner known in the art.

It is to be understood that, in practice, there will be plural and likely a very large number of external devices 102 connected to the network 144. Also, the virtual content server 120 may be a unitary device but would preferably be implemented as a server farm or a distributed computing system in order to handle large capacities of virtual content stored in virtual content database 126 and the many simultaneous connections with external devices 102.

The external devices 102 may include conventional components such as one or more applications 104, a browser 106, one or more memory devices 114, and one or more processors (CPUs) 112. Examples of external devices 102 include such known computing devices such as smart phones, tablets, desktop PCs, etc. Conventional components such as displays, speakers, microphones, connectors, and input devices may also be included in the external device 102 as is well known.

Aspects of the invention include an action detection/add action request engine 108 and a virtual content request engine 110 as part of a conventional device such as a smart phone, tablet, or desktop PC. The action detection/add action request engine 108 and the virtual content request engine 110 may be implemented separately or together as a part of application 104 or a browser 106, or may be independent as illustrated.

It is to be understood that the CPUs and memory devices (e.g., the CPU 112 and memory 114 for the external device 102 and/or the CPU 130 and memory 132 for the virtual content server 120) may be arranged as dedicated units each programmed with the functionalities described herein for the various functional units, such as the virtual content request engine 122 and the action detection/add action request engine 108, described in more detail later, or may be hardware resources that are shared among multiple functional units. The hardware design choice for such arrangements is governed by routine engineering principles such as size, weight, cost, etc., based on components available at the time of implementation. Moreover, the inventive techniques and aspects described herein, although shown in block diagram form, may be implemented using a combination of hardware, firmware, and/or software as is known in the art.

The virtual content server 120 may include a virtual content selection engine 122, a user database 124, a virtual content database 126, a campaign database 128, a log database 134, one or more processors (CPUs) 130, and one or more memory devices 132. The virtual content selection engine 122, the user database 124, the virtual content database 126, the campaign database 128, and the log database 134 may be part of the virtual content server 120 as illustrated, or provided as independent components in communication with the virtual content server 120 in a manner known in the art. For example, virtual content server 120 may be provided as a distributed computing system.

The user database 124 stores user ids of users in association with different types of information, such as information regarding one or more virtual content campaigns, etc., as will be described in more detail later with respect to FIGS. 9 and 10. The campaign database 128 stores campaign ids of virtual content campaigns in association with different types of information such as virtual content provider account information, campaign-associated virtual content, display order information for content items of the campaign, etc., as will be described in more detail later with respect to FIG. 8.

The virtual content database 126 may include any type of virtual content, including, e.g., advertisement content, that is received from one or more virtual content providers 140 via network 144. The virtual content selection engine 122 may be implemented as part of a conventional virtual content (advertisement) serving system.

A concept of the invention is to provide technical solutions granting virtual content providers 140 (e.g., advertisers) an opportunity to provide multiple items of their virtual content, such as multiple advertisements or ad groups, to users in a particular sequence, according to a particular logic, etc., as part of an ordered virtual content campaign. For example, a virtual content provider may wish to present a sequence of ads (ad creatives) to a specified group of users such that the users are presented with (i.e., served, delivered) the ads in a predetermined order.

Accordingly, a concept of the invention is to store information regarding which ordered campaigns have had a virtual content item (e.g., ad or ad group) presented to a particular user. A further concept of the invention is to store information regarding how many or which ones of the virtual content items associated with an ordered campaign have been presented to a particular user. In this manner, the next time the ordered campaign is chosen to be served to the user, the next virtual content item in the sequence may be served to the user. By doing so, the virtual content provider can implement a campaign including of a sequence of virtual content that collectively tell the end user a story, present a compelling aesthetic or argument, etc.

For example, an advertiser may use a series of ads to market a product to the user by explaining various features of the product in series. An insurance company may create a set of video ads promoting different insurance policies they are selling. Each insurance policy or savings plan may be tied to different stages of a user's life. It may make sense for the advertiser to create multiple videos that tell a complete story about how the life of the character in the video is helped by the insurance company's various policies. Owing to the inventive concepts described herein, the insurance company is permitted to present/serve these videos in a particular order, such as from the beginning to the end of life-related insurance content.

According to aspects of the invention, one or more of applications 104 and browser 106 on external device 102 may include a virtual content space 118 for presenting received virtual content 190. For example, application 104 may be an application of a virtual content publisher, such as an ad publisher using an advertisement publishing system. By way of further example, browser 106 may be directed to display a website of a virtual content publisher, where the website includes a virtual content space 118. Alternately, browser 106 may include a virtual content space 118 as part of the browser application itself. It is to be understood that according to aspects of the invention multiple virtual content spaces 118 may be provided within one application (or browser or webpage, etc.).

According to further aspects of the invention, an application (or browser) on external device 102 sends a virtual content request 180 to the virtual content server 120. The virtual content server 120 then retrieves and selects virtual content 190 to send to the external device 102 to present in virtual content space 118, based at least in part on a user id of a user operating the requesting application or otherwise using external device 102 in some fashion. The user id is included in virtual content request 180. This process is described in more detail with respect to FIG. 4.

Figure 2:
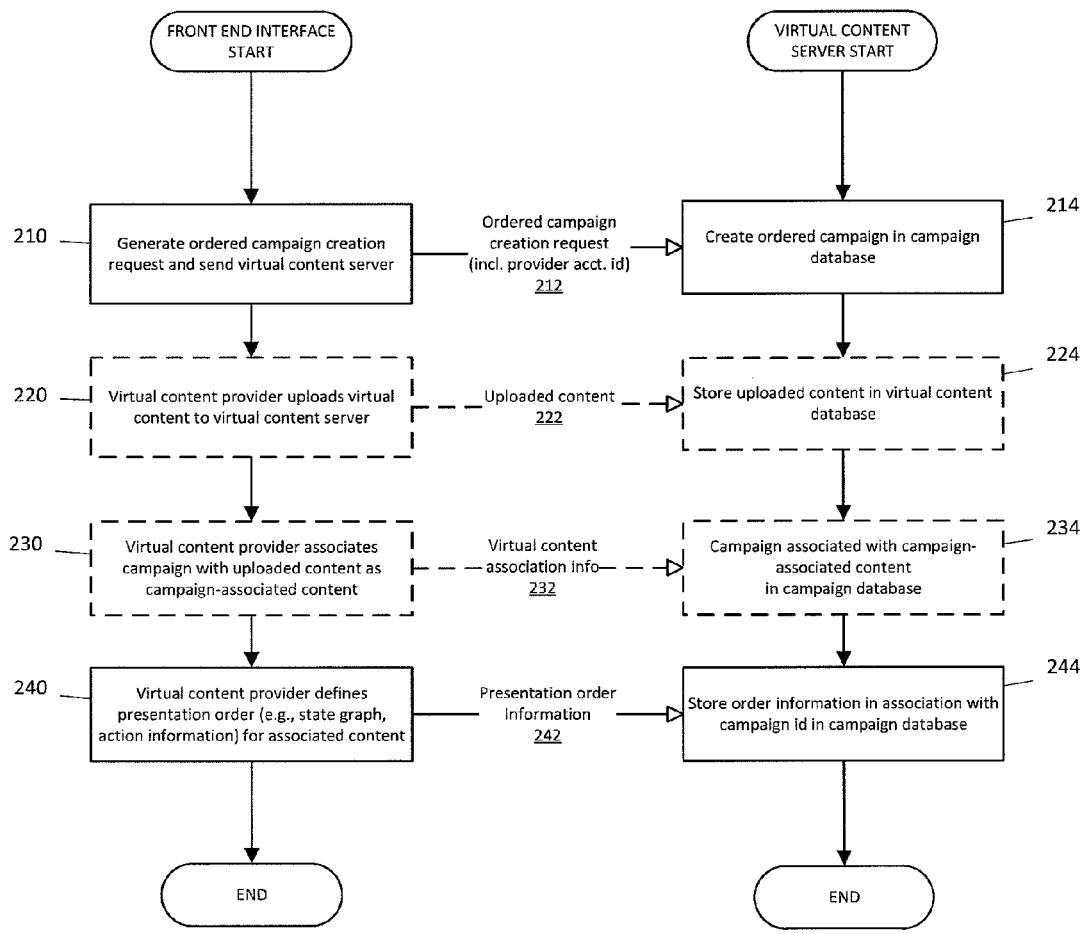

FIG. 2 illustrates a flow diagram for a process 200 of generating an ordered campaign in campaign database 124 through operation of a front end interface 142, according to aspects of the invention.

At step 210, a virtual content provider 140 (e.g., advertiser, app developer, etc.) desiring to create an ordered campaign operates front end interface 142. In response to the virtual content provider's operation, front end interface 142 generates and sends ordered campaign creation request 212 to virtual content server 120. The ordered campaign creation request 212 may include at least a virtual content provider account id of the virtual content provider requesting creation of the ordered campaign, although further descriptive information may also be included.

At step 214, the virtual content server 120 receives the ordered campaign creation request 212 and stores a campaign id for the ordered campaign in campaign database 128.

FIG. 8 shows an example in which one or more campaign ids 820 are stored for campaigns in association with a virtual content provider account id 810 in the campaign database 800.

At step 220, the virtual content provider 140 may upload virtual content 222 to virtual content server 120, where it is stored in virtual content database 126 at step 224.

At step 230, according to operation of the front end interface 142 by the virtual content provider 140, the front end interface 142 generates virtual content association information 232 indicative of the association of the ordered campaign with uploaded or otherwise designated virtual content (e.g., ad groups) stored in the virtual content database 126. In other words, a provider 140 designates which content stored in the virtual content database 126 to associate with the campaign. The front end interface 142 then sends the virtual content association information 232 to virtual content server 120.

At step 234, the virtual content server 120 receives the virtual content association information 232 from the front end interface 142 and associates the campaign id 820 with the virtual content designated in the received virtual content association information 232.

FIG. 8 shows an example in which campaign-associated content information 830 designating content in the virtual content database 126 is stored in campaign database 800 in association with a campaign id 820.

At step 240, the virtual content provider 140 defines a desired presentation order for the campaign-associated content of the ordered campaign. The front end interface 142 generates and sends order information 242 describing the desired presentation order to virtual content server 120.

At step 244, the virtual content server 120 stores the order information 242 in campaign database 128 in association with the campaign id 810 of the ordered campaign. Examples of campaign-associated content defined in a presentation order are shown, e.g., in FIGS. 3A and 3B.

Figure 3A:
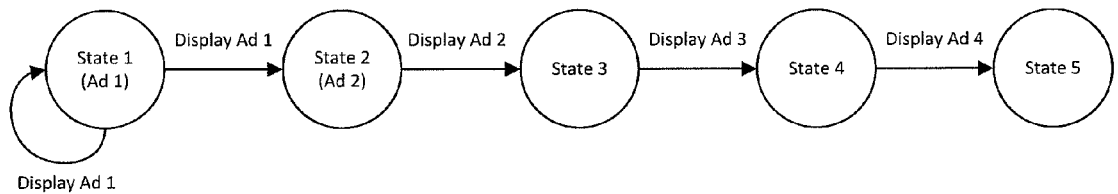
FIG. 3A illustrates an example of a linear sequence 300a for presenting successive content (e.g., ads 1 to 5) to the user.

In some embodiments, the provider may desire to present campaign-associated content items to a user in a particular linear sequence. FIG. 3A illustrates an example of a linear sequence 300*a* for presenting successive content (e.g., ads 1 to 5) to the user, according to aspects of the invention. In this case, the order information 242 may describe the position of particular items of campaign-associated content within the sequence, e.g., using a counter.

Figure 3B:
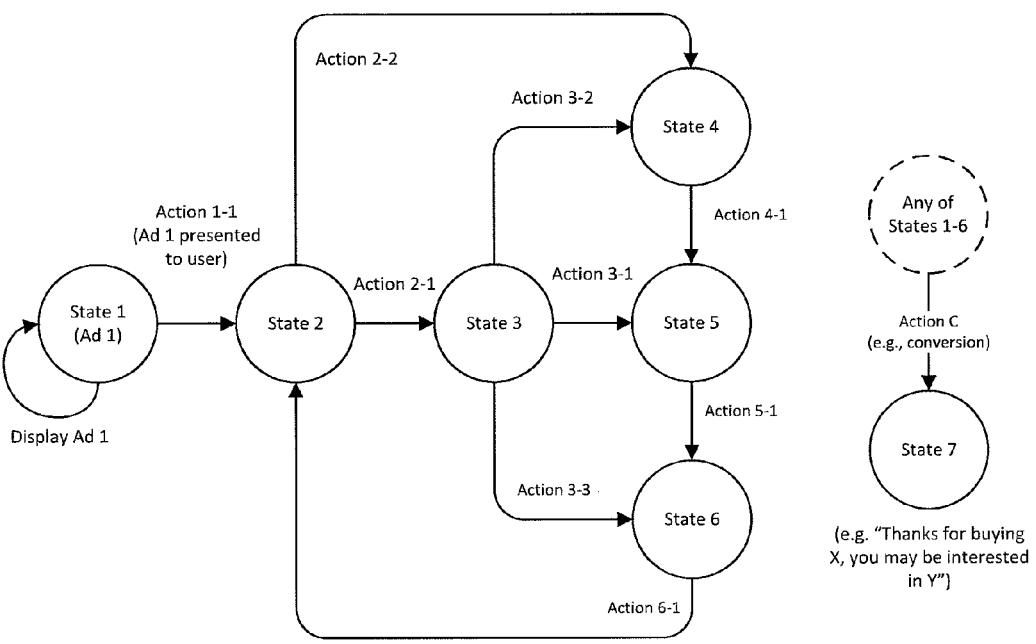
FIG. 3B illustrates an example of a state transition graph 300b for a more complicated state-based presentation order for virtual content items of an ordered campaign.

In other embodiments, the provider may desire to present campaign-associated content items to a user according to a state transition graph (or state transition matrix). FIG. 3B illustrates an example of a state transition graph 300*b* for a more complicated state-based presentation order for virtual content items of an ordered campaign, according to aspects of the invention. In this case, the order information 242 may describe which content item(s) of the ordered campaign are associated with which particular state(s) of the state transition graph. In some embodiments, the order information 242 may define preconditions, such as particular actions or events, which when satisfied cause the ordered campaign to progress from one state to another state according to the state transition graph or matrix (in a manner to be described in more detail later).

It is to be understood that, in further embodiments, steps 220 and 224 may be entirely optional, since the virtual content provider 140 may have already uploaded to virtual content database 126 the virtual content the provider desires to associate with the ordered campaign. In other embodiments, steps 230 and 234 may also be entirely optional, since the virtual content provider 142 may have previously associated virtual content items with a campaign without yet defining the presentation order for the associated virtual content items.

For example, a provider may have previously associated virtual content items with a non-ordered campaign, which the provider may desire to change to an ordered campaign. This may be accomplished by defining the presentation order for the previously associated content items at front end interface 142, which sends order information 242 to virtual content server 120 to store in association with a campaign id. In other embodiments, a flag (not shown) indicating whether a particular campaign is an ordered or non-ordered campaign may be stored in the campaign database 128 in association with the campaign id for that campaign.

According to aspects of the invention, during creation of the ordered campaign the virtual content provider 140 may provide additional campaign information to store in the campaign database 128. This additional campaign information may include, e.g., label data describing the ordered campaign, one or more keywords to associate with the ordered campaign, expiration data indicating a desired expiration date for campaign ids stored in the user database in association with user ids of users, etc. In some embodiments, this campaign information may be sent to virtual content server 120 as part of the ordered campaign creation request 212.

In other embodiments, the campaign information may be sent separately to the virtual content server 120 through operation of the front end interface 142 at any time after the ordered campaign has been created. When received at virtual content server 120, the campaign information is stored in association with the campaign id in the campaign database 128.

FIG. 4 illustrates a flow diagram of a process 400 of virtual content server 120 retrieving and sending virtual content 190 to external device 102 in response to a virtual content request 180 received from the external device 102, according to aspects of the invention.

At step 405, an application 104 on external device 102 (or browser 106 or other aspect of device 102) may cause virtual content request engine 110 to generate a virtual content request 180 for requesting that virtual content be retrieved from virtual content database 124 and sent from the virtual content server 120 to the device 102 so that the retrieved content may be presented to a user of the device 102. The virtual content request engine 110 may be implemented separately or together as a part of an application or a browser, or may be independent as illustrated in FIG. 1, for example.

In some embodiments, the virtual content request engine 110 may generate the virtual content request 180 in response to a particular operation of an application or aspect of the device by the user. In other embodiments, the virtual content request engine 110 may generate the virtual content request 180 as part of general operation of an application or device aspect without particular operation by the user.

At step 410, the virtual content request engine 110 retrieves a user id, i.e., user identification information regarding the user to be presented with requested virtual content from the virtual content server 120, from the device 102 or some other source.

In some embodiments, the user id may be the device id of the external device 102, such as a mobile device id. In current conventional technology external device 102 may already have a device id stored therein. In some embodiments, external device 102 may provide or otherwise make accessible its device id to a requesting application 104 or virtual content request engine 110 (or action detection/add action request engine 108, to be described in more detail later with respect to FIG. 5). Alternatively, the requesting application/engine may obtain, access, or otherwise read the device id.

Desktop devices do not typically include such a device id in the same way that is common to a typical mobile device, but it is also possible that desktop devices and other network-enabled devices may have or may be provided with a device id and that such a device id could be made available to virtual content request engine 110 (or action detection/add action request engine 108). For example, according to aspects of the invention, the user id may be, e.g., a combination of a device internal clock skew and one or more device-related signals that may help further distinguish devices, such as a device's Web browsing user agent string, device IP, device location, etc.

In other embodiments, where the requesting application is a web browser 106 operable to send the virtual content request 180 (or otherwise instruct virtual content request engine 110 to do so) the user id may be a browser cookie identifying the user.

By way of further example, browser 106 may be directed to a website of a virtual content publisher, such as a publisher of ads using an advertisement publishing system, where the website includes a virtual content space 118. Alternately, browser 106 may include a virtual content space 118 as part of the browser application itself. According to aspects of the invention, virtual content space 118 displays or otherwise presents virtual content 190 received from virtual content server 120 in response to a virtual content request 180.

In further embodiments, the user id may be a user log-in id associated with one or more applications, web sites, and/or an overarching user account log-in id for a cross-platform application group or a user id for a sales-based transaction application or website (e.g., the virtual content provider's website, etc.).

It is important to note that any or all of the unique identifiers (e.g. device identifier, browser cookie, user log-in id, etc.) are preferably processed with an anonymizing function, such as a one-way MD5 hashing function, by the virtual content request engine 110. The hashing or other equivalent conventional process is preferred because it protects confidential information and provides anonymity.

When the virtual content server 120 receives the (hashed) user id, the virtual content server 120 is prevented from obtaining specific identity information of the device, user, and/or application and is allowed only to use the hashed user id to uniquely identify the device, user, and/or application from other devices, users, and/or applications. Thus, by processing the obtained user id with a hash function, individual users are protected through removal of specific identity information of a device, a user or an application program. Although not strictly necessary for nominal operation, these features are particularly important with respect to the user identification information.

At step 415, virtual content request engine 110 generates and sends the virtual content request 180, including at least the retrieved user id, to the virtual content selection engine 122 of virtual content server 120.

In some embodiments, the virtual content request 180 may include further information or criteria regarding the content to be retrieved in response to the virtual content request 180. For example, such criteria/conditions may include the type of virtual content requested, such as textual content, image content, animated image content, interactive media content (e.g., Flash), video content, etc. Other criteria/conditions may include, e.g., the current context in which the virtual content retrieved in response to the virtual content request 180 will be presented to the user on the requesting device 102, such as the user's location, the user's preferred language, the user's time of day, an identifier describing the container (e.g., virtual content space 118) in which the retrieved virtual content will be presented. This identifier may indicate, e.g., the name of the requesting mobile or desktop application 104, the URL of a Web page of the requesting browser 106, etc. Other existing industry recognized criteria or practices for selecting eligible virtual content (ad) campaign candidates may be included in virtual content request 180 of the present invention without imposing unnecessary restrictions on such industry standard techniques.

At step 420, the virtual content selection engine 122 receives the virtual content request 180 including the user id of the user from requesting external device 102.

At step 425, the virtual content selection engine 122 determines eligible virtual content candidates (e.g., ads and/or ad groups, ad campaigns, etc.) in virtual content database 126 from which to select and retrieve the virtual content to be served to the user in response to the virtual content request 180.

According to aspects of the invention, virtual content selection engine 122 and virtual content database 126 may be a conventional ad serving system that provides ad candidates in response to an ad content request. Such a conventional ad serving system may use contextual matching (e.g., based on current and/or past search queries, context of publishing page, history, etc.) or other algorithms to determine the virtual content candidates from the available content that may be served in response to the virtual content request 180. Any and all such conventional or future developed ad or virtual content serving systems and methods are within the scope of this section.

In some embodiments, information regarding criteria or conditions for the retrieved virtual content may be included in virtual content request 180, as previously discussed. Such information may be used by the virtual content selection engine 122 to determine the eligible virtual content candidates.

In some embodiments, an ordered campaign may enter the auction process as any other ad or ad campaign along with an auction bid. Because a selection algorithm may try to serve ads which have been clicked more often before, the campaign-associated content may succeed more often because it is likely to be more relevant to users and, therefore, more likely to be clicked more often. Note that the combination of auction bid and user relevance (ascertained from past clicks, for example) may be used to determine which ad is served according to the auction.

In other embodiments, the virtual content selection engine 122 may further determine which campaign ids in the user database 124 are stored in association with the user id received in the virtual content request 180. For example, the user id may have already been stored in the user database 124 in association with one or more campaign ids when the user was presented with a virtual content item of the ordered campaigns of the campaign ids. Thus, in step 425, virtual content selection engine 122 may determine which campaign ids of ordered campaigns in campaign database 128 have already been associated with the received user id (if any). Virtual content selection engine 122 may then determine one or more of the ordered campaigns associated with the user id to be included as virtual content candidates.

At step 430, the virtual content selection engine 122 selects the "winning" (i.e. highest ranked) virtual content from the virtual content candidates. In an exemplary embodiment, the virtual content selection engine 122 may apply conventional virtual content (ad) selection logic and/or auction-based algorithms to determine, from among content candidates, which ad campaign to serve up as an impression (i.e., an instance of retrieval and presentation of virtual content to the user) to a requesting device such as external device 102.

For example, such auction-based logic may involve a prediction of the revenue-per-mille (RPM) (expected revenue per 1000 impressions) and/or the clickthrough rate (CTR) for each eligible ad. For an eligible ad from an ordered campaign, the CTR may be based according to the probability of the next ad (i.e., the virtual content associated with the next state in the state transition graph) in the ordered campaign being clicked or otherwise selected by a user. The selection algorithm may also involve a prediction of the cost to the virtual content provider associated with the next ad in the ordered campaign based on how much the advertiser has bid per impression of the ad, i.e., cost per impression (CPM) rate, or how much the advertiser has bid per click or other action with respect to the ad by a user, i.e., cost per click (CPC) rate.

Typically, RPM prediction of virtual content in an un-ordered campaign can be standard industry practice. For RPM prediction of virtual content in an ordered campaign according to aspects of the invention, however, the virtual content server 120 may predict the expected ad impressions made for a campaign with an ordered ad transition graph. If the entire ordered ad transition sequence is paid according to a CPM model, then no further prediction may be needed. On the other hand, if the entire ad transition is paid according to a CPC model, the virtual content server 120 may also predict the expected clicks through the entire ad transition from beginning to end. Other potential prediction schemes are within the scope of this section.

At step 440, the virtual content selection engine 122 determines whether or not the winning virtual content is or otherwise corresponds to an ordered campaign stored in campaign database 128. In some embodiments, campaign ids 820 of both non-ordered and ordered campaigns may be stored in campaign database 128 in association with virtual content provider account ids 810 (see FIG. 8). Optionally a flag (not shown) indicating whether or not a particular campaign is an ordered campaign may be stored in campaign database 128 in association with the campaign id 820. Alternately, virtual content selection engine 122 may determine whether or not the winning campaign is an ordered campaign according to the presence or absence of any presentation order information 840 stored in the campaign database 128 in association with the campaign id of the winning campaign.

At step 445, when the winning campaign (or ad) is determined not to be an ordered campaign (e.g., a single ad or non-ordered campaign) the virtual content selection engine 122 selects and retrieves one or more virtual content associated with the non-ordered campaign to serve to device 102. Which virtual content item(s) of a non-ordered campaign to serve may be determined at random, based on conventional virtual content (ad) selection and/or auction-based algorithms, or other criteria.

At step 450, when the winning campaign is determined to be an ordered campaign the virtual content selection engine 122 retrieves one or more associated content items of the ordered campaign from virtual content database 126 based on the current state of the ordered campaign for the user id received in virtual content request 180. This process is described in more detail later with respect to FIGS. 6 and 7.

At step 460, the virtual content selection engine 122 (or virtual content server 120) sends the retrieved virtual content 190 to the external device 102 in response to the virtual content request 180.

Optionally, at step 490, the virtual content server may assess fees to charge the provider(s) of the selected virtual content 190. This may be based on how much the provider is willing to pay for an impression or click (i.e., the CPM or CPC rates). For example, the exact content that is delivered to the device may depend on a combination of the CPM or CPC, the relevance of the ad to the user, and the likelihood that the user will click on the ad, i.e., predicted click through rate (CTR). In other embodiments, the expected cost per mille (eCPM) used in an auction may be a function of not only CPC and a predicted CTR, but may also take into account the predicted cost for some or all of the ads within the sequence or state transition graph of the ordered campaign, i.e., "down the stream."

At step 470, the external device 102 receives the virtual content 190 sent from the virtual content server 120.

At step 480, the external device 102 displays or otherwise presents the received virtual content 190 in a virtual content space 118 or as some other presentable aspect of the requesting application/browser/etc. In this manner, the user of the device 102 may view or otherwise be presented with the received virtual content 190.

It is to be understood that according to aspects of the invention it is possible that plural winning campaigns and/or content items may be determined and retrieved according to a virtual content request 180 sent from a requesting external device 102, particularly if there are plural virtual content spaces 118 available to present content retrieved from the virtual content database 126.

FIG. 9 shows an example in which campaign ids 930 and state information 940 indicating a current state of the ordered campaign for the campaign id are stored in user database 900 in association with user ids 910. In some embodiments, user database 900 may also store identifiers identifying non-ordered campaigns and/or additional user information 920.

In embodiments where the presentation order information for an ordered campaign defines a linear presentation sequence (such as shown in FIG. 3A), state information 940 may be a counter indicating a position in the linear sequence. In this case, when the winning campaign has been selected in step 435, the virtual content selection engine 122 determines the current state of the ordered campaign for the received user id according to process 600 shown in FIG. 6.

In other embodiments where the ordered campaign defines a more complex state transition graph (such as shown in FIG. 3B), the value for the state information 940 may updated according to a progression from the previous state to the next state based on whether one or more criteria (performed actions, achieved events, or other criteria) defined for the state transition graph in the stored presentation order information 242 have been satisfied. This process is described later with respect to FIG. 7.

FIG. 6 illustrates a flow diagram of sub-process 600 (corresponding to step 450 in FIG. 4) for retrieving a virtual content item of a linear ordered campaign from virtual content database 126 based on the current state of the ordered campaign for the user id included in virtual content request 180.

After the virtual content selection engine 122 determines the winning campaign to be an ordered campaign (see step 440 in FIG. 4), at step 605 the virtual content server 120 determines whether the campaign id of the winning campaign is already stored in user database 124 in association with the user id received in virtual content request 180. For example, the winning campaign selected in step 430 may or may not have been previously selected for presentation to the user (i.e., served to device 102 associated with the received user id).

When it is determined in step 605 that the campaign id of the winning campaign is already stored in association with the received user id, at step 610 the virtual content selection engine 122 reads the state information 940 (e.g., counter) stored with the user id 910 for the campaign id of the winning campaign.

At step 615, the virtual content selection engine 122 retrieves one or more campaign-associated content 830 of the winning campaign according to which position in the presentation order information 840 (as defined for the winning campaign in campaign database 128) corresponds to the state information 940 read by virtual content selection engine 122 (i.e., the position indicated by the counter). This retrieved virtual content 190 is then sent to the requesting external device 102 (see step 460 in FIG. 4).

At step 620, when it is determined in step 605 that the campaign id of the winning campaign is not already stored in association with the received user id, the virtual content selection engine 122 stores the winning campaign id in user database 124 in association with the received user id and initializes the state information 940 for the winning campaign id (e.g., initializes counter to first position of linear sequence).

At step 625, virtual content selection engine 122 retrieves the content item associated with the initial state (i.e., first position of the linear sequence) of the winning campaign according to the order information 840 stored in campaign database 128 in association with the winning campaign. This retrieved virtual content is then sent to the requesting external device 102 (see step 460 in FIG. 4).

At step 630, the state information 940 for the winning campaign is updated (iterated) to reflect that a virtual content item of the ordered campaign was served to the device 102 in response to virtual content request 180. In this manner, the next time the same ordered campaign is selected for presentation to the user according to the process 400 in FIG. 4, the state information will indicate the next position in the sequence. In this manner, the virtual content selection engine 122 will retrieve the virtual content corresponding to the next position in the sequence. Thus, each time the same campaign is selected as the winning campaign for a particular user, that user will be presented with another content item in the sequence as intended and defined by the virtual content provider 140. It is to be understood that step 630 may occur before or after the retrieved virtual content is sent to the requesting external device 102 in step 430.

In other embodiments of the invention, the ordered campaign may be defined to include default conditions for states of the ordered campaign where the content item for the same state (ad) can be repeatedly shown for a predetermined maximum number of times before proceeding to the next state in the sequence.

As previously discussed, according to aspects of the invention the provider (advertiser) may use the front end interface 142 to define, as part of the presentation order information 242 for an ordered campaign, one or more actions associated with one or more of the states in the state transition graph, and, accordingly, the virtual content item(s) associated with each particular state.

In some embodiments, the actions may be defined as part of the state transition graph (matrix) described by the presentation order information 242. By way of example, a particular ad creative (virtual content) in an ad campaign might show a click-to-call icon as well as a URL of the company or product of the ad. The advertiser may wish to define actions that the user of device 102 might perform with respect to the ad creative when it is presented to the user, such as, e.g., (1) clicking on the URL displayed in the ad; (2) clicking the click-to-call icon and initiating a phone call; and (3) saving the call number to the user's contact list on the device 102 (or to the network, cloud server, etc.). For each of these actions, the advertiser may wish to present a different follow-up ad to the user according to which action the user performed with respect to the first ad.

This situation may be more readily understood with respect to FIG. 3B. In FIG. 3B, State 3 is defined by the state transition graph to proceed to one of State 4, State 5, and State 6 according to which of Action 3-1, Action 3-2, or Action 3-3 are performed or otherwise achieved by the user with respect to the ad creative presented for State 3. For example, State 3 may correspond to a particular ad creative for the ordered campaign according to the order information and associated content information stored in the campaign database 128 for the campaign. As defined in the order information, Action 3-1 for State 3 may correspond to the action of a user clicking on a URL displayed in the ad creative, Action 3-2 may correspond to the action of a user clicking a "click-to-call" icon displayed in the ad creative, and Action 3-3 may correspond to the action of a user performing a "mouse-over" with respect to displayed ad creative (i.e., mouse pointer passing over the ad creative).

In this example, a user is presented with the ad creative for State 3 according to aspects of the invention. If the user clicks the URL (i.e., performs action 3-1) the state of the campaign for that user (as stored in user database 124) transitions from State 3 to State 5 according to the order information (see FIG. 3B). Accordingly, the next time this particular ad campaign is served to the user, the user will be presented with the ad creative associated with State 5. On the other hand, if the user instead performs a mouse-over of the displayed ad creative (i.e., performs Action 3-3 with respect to State 3) the state of the campaign transitions from State 3 to State 6 for that user, who will be presented/served with the ad creative for State 6 the next time the campaign is selected to be served to the user.

In other embodiments, the state transition graph for the ordered campaign may be defined to include default conditions with respect to one or more states of the campaign. For example, a particular state may have a default condition such that, when no actions have been performed with respect to the state (e.g., when no add action requests have been received with respect to that state and no action information has been stored in association with the user id in the user database), the same state (ad) may be repeatedly presented to a user a predetermined number of times before the ordered campaign proceeds by default to the next state (or a particular default state) even if no action information with respect to that state has been received. In other words, the campaign state information may be maintained at the current state in the absence of action information until the content item of the current state has been displayed to the user a predetermined number of times. Alternately, the campaign state information of the ordered campaign may be updated to the next state after a predetermined time period has elapsed, even if no action has been performed with respect to the state.

In other embodiments, the presentation order information 242 (i.e., state transition graph) may define one or more actions that are not performed with respect to any particular virtual content item (ad creative) of the campaign-associated content. In an exemplary embodiment the virtual content provider (advertiser) may define a conversion event (i.e., a purchase transaction, product sale, etc.) as a potential action to be performed with respect to an ordered campaign.

For example, after being presented with an ad of an ordered ad campaign the user may or complete a purchase transaction of the product or service being advertised by the campaign, e.g., on the advertiser's website. In this case, the advertiser may desire the next virtual content shown to the user as a part of that campaign to be dependent on whether or not the user has bought the product being advertised by the campaign. Accordingly, the virtual content provider may define the state transition graph such that the completion of a conversion event will cause any current state in the graph to transition to a state associated with, e.g., post-sale content that the provider wishes to serve to the user next. By way of example, FIG. 3B depicts a state transition graph including State 7, which is reached from any of States 1 to 6 according to whether a conversion event (Action C) has occurred.

FIG. 5 illustrates a flow diagram of a process 500 of generating and sending an add action request 170 from device 102 to virtual content server 120 to store action information (e.g., action id) in user database 124 in association with the user id of the user who performed or otherwise completed the action. This action information may be indicative of an action defined for an ordered campaign by the virtual content provider.

At step 510, the action detection/add action request engine 108 detects the performance of an action (i.e., fulfillment of a predetermined condition, occurrence of a predefined event, etc.) with respect to some previously-defined aspect of an ordered campaign. In some embodiments, the action detection/add action request engine 108 may be formed as part of an application 104 or browser 106, or other aspect of device 102 on which the action is performed. In other embodiments, such as when a conversion event is completed by the user, an action detection/add action request engine 108 may be formed as part of the application, website, and/or device the user operates to purchase the related product or service and complete the conversion event.

For example, the application, browser, or other aspect of the device may have source code including one or more code snippets compiled in one or more particular locations within the code corresponding to trigger point for execution of the code snippets when a particular action is performed, an event is achieved, or a condition is otherwise satisfied.

In some embodiments, the virtual content format may be tied to social networking. In this case an action may be detected, e.g., when a user indicates that he or she "likes" a particular virtual content or campaign using the social network, or when the user shares a particular virtual content or campaign with friends using the social network.

Other possible actions may clearly be contemplated without departing from the scope of the invention. For example, if the virtual content displays a draggable map the detected action may be when the user drags the map with the mouse or other input. If an ad has an expandable format, the action may be defined as the expansion of the ad. If the ad has a playable video embedded therein, the action may be detected when the user plays the video in the ad. A "mouse-over" event may be detected using Javascript handlers.

At step 520, the action detection/add action request engine 110 retrieves a user id (i.e., user identification information) of the user who performed the action. In some embodiments, the user id may be retrieved similarly to the user id retrieved for inclusion in the virtual content request, as previously described with respect to FIG. 4 above. In embodiments where the action is a conversion event, the retrieved user id may correspond to a user log-in id or other user identification information relating to the application, website, etc. the user operates to complete the conversion event. In further embodiments, when the conversion event is completed by the user on a device having a retrievable device id, the retrieved user id may correspond to the device id of the device.

At step 530, the action detection/add action request engine 110 generates an add action request 170 for requesting that action information regarding the detected action be stored in user database 124 in association with the retrieved user id of the user who performed the action. The add action request 170 includes the retrieved user id and the action information identifying or otherwise indicating or describing the detected action (event), and the action detection/add action request engine 108 (or other aspect of device 102) sends the generated add action request 170 to virtual content server 120. In embodiments where the action is a conversion event, the add action request 170 may be generated, e.g., by the advertiser's website or other point-of-sale device which the user uses to purchase a product or service associated with the ordered campaign. For example, the virtual content provider may include a Javascript code snippet on the provider's webpage that will load in the user's browser when the user completes a transaction. The code snippet may cause cookie information identifying the user to be sent to the virtual content server 120 as part of an add action request 170.

At step 540, the virtual content server 120 receives the add action request 170, including the user id and action information from the external device 102. In an exemplary embodiment, the add action request 170 may further include one or more of the campaign id of the campaign for which the action was performed and the account id of the virtual content provider associated with the campaign. In other embodiments, the action information may uniquely identify a particular action with respect to a particular campaign stored in the campaign database 128.

At step 550, the virtual content server 120 updates the state information for the campaign id associated with the user id and action information (and campaign id) received in the add action request 170, according to the state transition graph defined by the order information for the campaign associated with the performed action.

In alternate embodiments, at step 560, instead of updating the state information when the action information is initially received, the virtual content server 120 may store the received action information for the campaign id in association with the received user id in the user database 124.

FIG. 10 shows an example in which campaign ids 1020 and action information 1030 are stored in association with user ids 1010 in user database 1000. In this case, the state information 1050 indicating the current state may be updated at a later time (e.g., after receiving a virtual content request 180, such as according to the process described below with respect to FIG. 7) based on the stored action information. This may allow for virtual content providers to define more complicated state transition graphs where progression from one state to the next may be dependent on whether or not multiple actions (i.e., completion of events, satisfaction of certain conditions, etc.) have been performed or not.

For example, the virtual content provider may require that the user needs to perform two actions (e.g., mouse over+play video, or click ad+conversion event) in order to trigger the next virtual content in the ordered campaign. In such embodiments, multiple action information indicating different performed actions may be received and stored in the user database 124 in association with the received user id.

In further embodiments, information regarding which content of the campaign has previously been served to the user (i.e., which states the user has previously achieved) and/or recent state information 1050 indicating the most recent state may also be stored in user database. Accordingly, the current state may be determined based on some or all of the action information stored in user database 124 for the user id of the user, which states have already been achieved for the received user id, and which state was most recently achieved.

Owing to the features of the invention, ordered campaigns with complex state transition graphs may be created with detailed conditions for proceeding through any number of states according to information received from many sources. For example, an ad agency may advertise products from many different advertisers. The ad to present next to a user may from one advertiser and be dependant upon the user having bought a product from an entirely different advertiser. As an example, linked advertisers may include a diamond company, a wedding planning service, a travel agency specializing in honeymoons, a mortgage broker, and a baby food company.

FIG. 7 illustrates a flow diagram of sub-process 700 (corresponding to step 450 in FIG. 4) for retrieving a virtual content item of a state-based ordered campaign from virtual content database 126 according to action information (etc.) stored for the campaign in user database 124 in association with the user id received in the virtual content request 180.

At step 750, the virtual content server 120 determines whether the campaign id of the winning campaign is already stored in user database 124 in association with the user id received in virtual content request 180. For example, the winning campaign selected in step 435 may or may not have been previously selected for presentation to the user corresponding to the user id (i.e., served to a device associated with the user id).

At step 755, when it is determined in step 750 that the campaign id of the winning campaign is already stored in association with the received user id, the virtual content selection engine 122 reads the one or more action information (and/or previously-presented content information 1040 and/or most recent state information 1050) stored in user database 124 with the user id for the winning campaign.

At step 760, the virtual content selection engine 122 determines the current state of the winning campaign for the received user id based on the information read from the user database 124 in step 755 and according to the logic of the state transition graph (matrix) described by the presentation order information 840 stored in campaign database 128 for the winning campaign. In some embodiments, once the current state has been determined, the recent state information may be updated to indicate the current state.

At step 765, the virtual content selection engine 122 retrieves the campaign-associated content 830 of the ordered campaign that corresponds to the current state determined by virtual content selection engine 122. This retrieved virtual content is then sent to the requesting external device 102 (see step 460 in FIG. 4).

When it is determined in step 750 that the campaign id of the winning campaign is not already stored in association with the received user id, at step 770 the virtual content selection engine 122 stores the winning campaign id in user database 124 in association with the received user id.

At step 775, virtual content selection engine 122 retrieves the content item associated with the initial state of the winning campaign according to the order information stored in campaign database 128 for the winning campaign. This retrieved virtual content is then sent to the requesting external device 102 (see step 460 in FIG. 4).

The discussions of the embodiments and the modifications of the embodiments above refer to advertisers and advertising contents, but are also applicable to other virtual content providers providing other types of virtual contents.

Furthermore, the concepts of the present invention are aimed to improve a user's experience of accessing information and/or using applications on a mobile device by ensuring that potentially desirable virtual content is served to the user and/or the mobile device. However, in some cases the features created by the concepts of the present invention may not be desirable to a user. Thus, a user will be allowed to opt-in or opt-out of the features created by the concepts of the present invention.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. A computer storage medium can be, or be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Although this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, although operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention being thus described, it will be obvious that the same may be varied in many ways. Such variations are not to be regarded as a departure from the spirit and scope of the invention, and all such modifications as would be obvious to one skilled in the art are intended to be included with the scope of the following claims.

What is claimed is:

1. A computer-implemented method, comprising:
receiving, at one or more server computers, an ordered campaign creation request;
storing, in a computer-readable memory operably connected to said one or more server computers, an ordered campaign in association with campaign-associated content including a plurality of content items, and state-transition information relating to a sequential presentation of the content items based on a content presentation sequence indicated in the ordered campaign;
storing, in a computer-readable memory operably connected to said one or more server computers, campaign state information indicating a current state of the ordered campaign in association an id of a requesting entity, the current state indicating which particular content items from among said plurality of content items have already been presented to the requesting entity associated with the id and also indicating a sequence in which the already-presented particular content items have been presented to said requesting entity;
receiving, at said one or more server computers, a virtual content request from an external device, the virtual content request including the id;
selecting, according to the campaign state information and the state-transition information, a subsequent content item, from among the plurality of content items included in the campaign-associated content, to send to the external device in response to the virtual content request;
sending the selected content item to the external device; and
updating the stored campaign state information of the ordered campaign such that the updated campaign state indicates a sequence in which the selected content item was presented to the requesting entity with respect to said any particular content items;
where the state-transition information includes one of a state transition graph or a state transition matrix representing a plurality of states, each state corresponding respectively to one of the plurality of content items and each state being associated with one or more available next states such that at least one state in the state transition graph or the state transition matrix is associated with two or more available next states; and
where the current state of the ordered campaign with respect to the id represents a state within the state transition graph or the state transition matrix such that the step of selecting a subsequent content item includes selecting a content item from among the content items corresponding to the available next states within the state transition graph or the state transition matrix.

2. The method of claim 1, further comprising:
storing a campaign id of the ordered campaign in association with the id of the requesting entity presented with an item of the campaign-associated content;
determining the campaign id stored in association with the id received in the virtual content request;
retrieving, as at least part of a plurality of virtual content candidates, a content item of the campaign-associated content of the ordered campaign according to the determined campaign id;
selecting a virtual content candidate from among the plurality of virtual content candidates,
updating the stored campaign state information of the ordered campaign when the selected virtual content candidate is a content item of the campaign-associated content of the ordered campaign.

3. The method of claim 1, wherein
the state transition information indicates a sequence of the content items to be presented,
the campaign state information indicates a current position in the sequence, and
updating the campaign state information comprises incrementing the indicated position in the sequence.

4. The method of claim 1, further comprising:
receiving an add action request including the id and action information identifying an action performed with respect to the ordered campaign.

5. The method of claim 4, further comprising:
storing the action information included in the add action request in association with the received id, in response to receiving the add action request, wherein
the campaign state information is updated according to the state transition graph based on the action information stored in association with the id.

6. The method of claim 4, wherein
the campaign state information is updated at the time the add action request is received.

7. The method of claim 5, wherein
the campaign state information is updated at the time the virtual content request is received, based on the action information stored in association with the id received in the virtual content request.

8. The method of claim 1, wherein the campaign state information is maintained at the current state unless action information identifying an action performed with respect to the current state of the ordered campaign has been previously stored in association with the id.

9. The method of claim 1, wherein the campaign state information is updated by moving to another state when a content item of the current state has been selected as the selected virtual content candidate a predetermined number of times, even if action information identifying an action performed with respect to the current state of the ordered campaign has not been previously stored in association with the id.

10. The method of claim 8, wherein the campaign state information is updated by moving to another state after a predetermined time period has elapsed, even if action information identifying an action performed with respect to the current state of the ordered campaign has not been previously stored in association with the id.

11. The method of claim 4, wherein the add action request further includes the campaign id.

12. The method of claim 4, wherein the action information indicates one or more of: selecting a hyperlink displayed in a content item, selecting a displayed click-to-call icon to initiate a phone call, saving a displayed call number in a contact list on a device of the requesting entity, indicating a preference for a particular content item of the ordered campaign using a social network, sharing a particular content item of the ordered campaign using a social network, expanding a displayed content item of the ordered campaign, initiating video playback associated with a content item, a mouse-over event with respect to a displayed content item, and a conversion event associated with the content item.

13. The method of claim 1, further comprising:
determining a plurality of campaign ids stored in a requesting entity database in association with the received id;
retrieving, as part of the plurality of virtual content candidates, content items of each of the plurality of determined campaign ids corresponding to the campaign state information associated with each campaign id, respectively.

14. The method of claim 1, wherein the campaign-associated content is virtual content uploaded to a virtual content server and associated with the ordered campaign based on input from a front end interface.

15. The method of claim 1, wherein
the id is one of a device id uniquely identifying the external device and an identifier uniquely identifying the requesting entity.

16. The method of claim 1, further comprising anonymizing the id.

17. The method of claim 1, wherein the ordered campaign creation request includes one or more of a virtual content provider id;
label data for describing the ordered campaign;
association data indicating virtual content stored in a virtual content database to be associated with the campaign as campaign-associated content; and
the state transition information for the campaign-associated content.

18. The method of claim 2, wherein the selected virtual content candidate is selected from among the plurality of virtual content candidates based on one or more factors including which of the virtual content candidates have been previously presented more often and auction bids associated with the virtual content candidates.

19. The method of claim 2, wherein virtual content candidates of the ordered campaign participate in an auction with virtual content candidates of non-ordered campaigns.

20. The method of claim 18, further comprising assessing fees to charge the virtual content provider as a function of an auction bid indicating how much the virtual content provider is willing to pay per action performed with respect to the selected virtual content candidate.

21. The method of claim 1, the state within the state transition graph or the state transition matrix represented by the current state is associated with two or more available next states; and
a transition from the current state to an available next state is determined based on an interaction by the requesting entity, the external device, or a user associated therewith, with an already-presented particular content item.

22. The method of claim 21, where a transition from the current state to a first of the two or more available next states is indicated in response to a previous click-to-call interaction with the content item associated with the current state by the requesting entity.

23. A virtual content serving system, comprising:
a processor; and
a memory, operatively coupled to the processor, including executable instructions for performing operations comprising:
receiving an ordered campaign creation request;
storing an ordered campaign in association with campaign-associated content including a plurality of content items, and state-transition information relating to a sequential presentation of the content items based on a content presentation sequence indicated in the ordered campaign;
storing campaign state information indicating a current state of the ordered campaign in a requesting entity database in association with a id of a requesting entity, the current state indicating which particular content items from among said plurality of content items have already been presented to the requesting entity associated with the id and also indicating a sequence in which the already-presented particular content items have been presented to said requesting entity;
receiving a virtual content request from an external device, the virtual content request including the id;
selecting, according to the campaign state information and the state-transition information, a subsequent content item from among the plurality of content items included in the campaign-associated content to send to the external device in response to the virtual content request;
sending the selected content item to the external device; and
updating the stored campaign state information of the ordered campaign such that the updated campaign state indicates a sequence in which the selected content item was presented to the requesting entity with respect to said any particular content items;
where the state-transition information includes one of a state transition graph or a state transition matrix representing a plurality of states, each state corresponding respectively to one of the plurality of content items and each state being associated with one or more available next states such that at least one state in the state transition graph or the state transition matrix is associated with two or more available next states; and
where the current state of the ordered campaign with respect to the id represents a state within the state transition graph or the state transition matrix such that the step of selecting a subsequent content item includes selecting a content item from among the content items corresponding to the available next states within the state transition graph or the state transition matrix.

24. The system of claim 23, wherein the virtual content serving system comprises a distributed computing system.

25. A non-transitory computer readable medium storing a program which when executed by a processor causes the computer to perform a method, comprising:
receiving an ordered campaign creation request;
storing an ordered campaign in association with campaign-associated content including a plurality of content items, and state-transition information relating to a sequential presentation of the content items based on a content presentation sequence indicated in the ordered campaign;

storing campaign state information indicating a current state of the ordered campaign in association with a id of a requesting entity, the current state indicating which particular content items from among said plurality of content items have already been presented to the requesting entity associated with the id and also indicating a sequence in which the already-presented particular content items have been presented to said requesting entity;

receiving a virtual content request from an external device, the virtual content request including id;

selecting, according to the campaign state information and the state-transition information, a subsequent content item from among the plurality of content items included in the campaign-associated content to send to the external device in response to the virtual content request;

sending the selected content item to the external device; and updating the stored campaign state information of the ordered campaign such that the updated campaign state indicates a sequence in which the selected content item was presented to the requesting entity with respect to said any particular content items;

where the state-transition information includes one of a state transition graph or a state transition matrix representing a plurality of states, each state corresponding respectively to one of the plurality of content items and each state being associated with one or more available next states such that at least one state in the state transition graph or the state transition matrix is associated with two or more available next states; and where the current state of the ordered campaign with respect to the id represents a state within the state transition graph or the state transition matrix such that the step of selecting a subsequent content item includes selecting a content item from among the content items corresponding to the available next states within the state transition graph or the state transition matrix.

* * * * *